Patented July 17, 1951

2,560,986

UNITED STATES PATENT OFFICE 2,560,986

MINERAL OIL COMPOSITIONS CONTAINING PETROLEUM WAX CARBOXYLIC ACIDS

Frederick P. Richter, Woodbury, N. J., assignor to Socony-Vacuum Oil Company, Incorporated, a corporation of New York No Drawing. Application March 7, 1947, Serial No. 733,180

3 Claims. (Cl. 252—39)

This invention relates to mineral oils containing certain petroleum wax carboxylic acids in sufficient proportion to improve the detergent properties of the oil.

The laboratory preparation of several specific alkyl carboxylic acids having between 15 and 36 carbon atoms in the alkyl chain, and a variety of salts of such acids have been previously reported. In all of these previously reported instances, however, the investigators were interested in producing single, pure, chemical compounds and the processes they used were tedious, involved and expensive. See for example, an article by Robinson in "The Journal of the Chemical Society," 1936 (1), 283.

The process herein described differs from these previous processes in that it is adapted to produce not one but a group of carboxylic acids, in which the acid radicals are attached not at a single position on the hydrocarbon chain, but at random along the chain. Furthermore, the process of producing carboxylic acids, in accordance with this invention, is far simpler and easier to perform than the processes previously used to produce single isolated carboxylic acids within this general range.

Carboxylic acids within the same general range have also been previously reported as having been prepared by oxidation (usually catalytic) of hydrocarbons in the wax range (C-15 to C-36). The products produced by such a process contain considerable quantities of degradation products and hydroxy acids, which make the product unsatisfactory for many purposes. The products of the present invention are essentially free of such degradation products and of any functional groups other than carboxyl.

In accordance with the present invention, petroleum wax or an analogous hydrocarbon material is converted into a mixture of Grignard reagents in accordance with United States Patent No. 2,464,751, issued March 15, 1949 to this same inventor. This process comprises, in brief, the chlorinating of petroleum wax or an analogous hydrocarbon, the purifying of the chlorinated wax by treatment with sulphuric acid, and then the reacting of the purified chlor wax with magnesium metal in ethyl ether solution and in the absence of water and oxygen.

A solution of the mixture of Grignard reagents, prepared as described above, or by any equivalent process, may be treated in accordance with the present invention with carbon dioxide either by passing the gas through it or by adding the carbon dioxide in solid form. This results in the formation of a mixture of magnesium salts which may be hydrolyzed by a mineral acid to form a mixture of wax carboxylic acids in which the carboxylic acid groups are randomly distributed along the hydrocarbon chain. Salts of the acid mixture may be prepared by reaction of the acid product with a metal carbonate, metal hydroxide, or by metathesis of alkaline metal salts of the acid with other metal salts, such, for example, as magnesium or zinc chloride. Metals of the class consisting of the metals of groups I, II and IV of the periodic table, and aluminum has been found particularly desirable for this purpose.

Presence of the wax or analogous group in the carboxylic acid promotes solubility of the salt in non-polar solvents, and, particularly, in lubricating oil. Thus, barium, magnesium, zinc and other salts of metals of the above mentioned class are soluble in hydrocarbon lubricating oil.

When dissolved in lubricating oil the new products act as detergents and show a definite tendency to improve the viscosity index.

A more thorough understanding of the numerous details and advantages of this invention may be gained by a consideration of the following specific examples.

Example I

A petroleum ether solution of a wax Grignard reagent prepared from 44 parts of purified monochlor wax (10.13% chlorine) in accordance with the procedure described in the patent application mentioned above, was treated with solid carbon dioxide over a two hour period at 0° C. At the end of this time no more carbon dioxide was being absorbed. The resulting suspension was treated with 200 parts of 25% aqueous sulphuric acid. The reactions were apparently as follows:

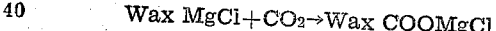

Wax $MgCl + CO_2 \rightarrow$ Wax $COOMgCl$

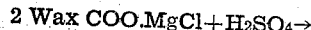

2 Wax $COO.MgCl + H_2SO_4 \rightarrow$

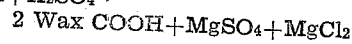

2 Wax $COOH + MgSO_4 + MgCl_2$

The resulting mixture consisted of a wax-like upper layer and a clear aqueous lower layer. To this mixture was added 150 parts of petroleum ether and after shaking, the aqueous lower layer was drawn off and discarded. The upper layer, a petroleum ether solution of wax carboxylic acid, was washed with water until the washings were neutral, to litmus, dried over anhydrous magnesium sulphate, and finally, after filtering, the volatile solvent was removed by distillation. The last traces of the solvent were removed by sparging under vacuum with dry nitrogen gas.

The wax carboxylic acid that resulted was a practically colorless liquid which solidified into a white waxy solid upon cooling. It melted slightly above room temperature and had an acid number of 75. The acid number as calculated from the original chlorine content, for complete conversion to carboxylic acid, is 156. Since the chlorine content of the final product was practically nil and could be accounted for as magnesium chloride formed in the competing coupling reaction, the yield of carboxylic acid was 48%. The remainder of the product consisted of hydrocarbons formed in the coupling reaction.

To remove the hydrocarbon impurity, the crude product (NN 75) was treated with 1.1N aqueous sodium hydroxide and isopropanol, in the proportion of 35 parts of the sodium hydroxide and 35 parts of isopropanol to 28 parts of the crude carboxylic acid. There resulted a cloudy dispersion which was extracted three times with 50 parts of petroleum ether, acidified with aqueous sulphuric acid and extracted again with petroleum ether. The petroleum ether extract was dried over anhydrous sodium sulphate, the solvent distilled off after filtering, and traces of the solvent removed by sparging with dry nitrogen at 100° C. under vacuum. There resulted a colorless liquid which solidified at 45–50° C. and had an acid number of 177.

Although the crude acid can be purified in a relatively simple manner as explained above, it has been found that the crude product itself is suitable for the preparation of salts and used for most practical purposes, without further chemical treatment.

Example II

The barium salt of the petroleum wax carboxylic acid described above was prepared by reaction with the barium hydroxide octahydrate. Since it was intended to use the barium salt in petroleum lubricating oil the salt was prepared from the crude carboxylic acid (NN 77) and was prepared in a medium consisting of petroleum lubricating oil. To prepare the barium salt the following were mixed:

| | Parts |
|---|---|
| Wax carboxylic acid (NN 77) | 150 |
| Barium hydroxide octahydrate (100% excess) | 65 |
| S. A. E. 30 solvent-refined Mid-Continent oil | 1800 |
| Toluene | 1500 |

The mixture was heated and stirred for three hours and the water of hydration and toluene distilled off. The mixture was then diluted with a low-boiling naphtha having a boiling range of about 80–130° C., and filtered to remove excess barium hydroxide. The solvent was then distilled from the filtrate under vacuum and the residue was found to consist of a clear solution of the barium salt of wax carboxylic acid in the mineral oil. Calculation indicated that this solution should contain 0.7% barium and analysis showed that it did contain 0.7% barium.

Example III

A magnesium salt of the wax carboxylic acid of Example I was prepared by neutralizing 50 parts of the crude wax carboxylic acid (NN 77) with a caustic soda solution and performing a metathesis upon this sodium salt with magnesium chloride. This was done by mixing 46 parts of the sodium salt with 21 parts of magnesium chloride ($MgCl_2 \cdot 6H_2O$) and 21 volumes of methanol. The mixture was heated under reflux for 5 hours and the methanol distilled off. The residue was heated with 150 volumes of 1 to 1 isopropanol-benzene and filtered. The solvent was removed by distillation and the residue, a waxy white solid, was the magnesium salt of the wax carboxylic acid. Calculation indicated that it should contain 1.65% magnesium, and analysis showed it to contain 1.75% magnesium.

The expression petroleum wax or analogous hydrocarbon has been used in the foregoing specification for the purpose of including within the scope of this invention, primarily, wax-like hydrocarbon mixtures containing from 15 to 36 carbon atoms and originating from petroleum oil. These hydrocarbons are believed for the most part to be straight-chain hydrocarbons. At any rate, petroleum wax is a well-known material in the oil indusry. By analogous products, there is intended to be included synthetically made products and products from other sources which have similar chemical and physical characteristics. Thus mixtures of approximately the same hydrocarbons from animal or vegetable sources or from coal tar or the like are included in the expression analogous materials, whereas vegetable waxes which are esters, and therefore chemically different, are not included.

While the Grignard reagent has been specifically described as a wax magnesium chloride compound, it is to be understood that any other halogen may be substituted for the chlorine.

It is preferred to prepare the Grignard reagent by the process set forth in United States Letters Patent No. 2,464,751, issued March 15, 1949 to this same applicant, but it is within the scope of this invention to prepare the Grignard reagent in any other manner that is now, or subsequently becomes, known.

The preferred salts of the new carboxylic acid mixtures are the barium, magnesium, and zinc salts, for these have been found particularly useful as detergents and emulsifiers in lubricating oils. Within the broader scope of this invention, however, are included all other salts of these new wax carboxylic acid mixtures The use of the new salts of wax carboxylic acids as addition agents for mineral oil is contemplated by this invention. Preliminary tests indicate that these new compositions, when added to mineral oil in amounts ranging from 0.01% or less to 10% or more are effective in improving the detergency, viscosity index, etc., of lubricating oils.

The present invention includes the lubricating oil compositions containing a minor proportion of the new reaction products, sufficient to improve the characteristics thereof.

The lubricating oil compositions included within the scope of this invention comprise not only mixtures of lubricating oil and the reaction products of this invention alone, but also lubricating oil compositions including these two ingredients and in addition thereto other additives, such as pour point depressants, extreme pressure lubrication improvers, stabilizing agents, viscosity index improvers, detergents, rust inhibitors and any other additive or additives which it may be found desirable to add. Preferably, the reaction products of this invention are incorporated in lubricating oils in amounts ranging from 0.1% to 2%. In some cases, amounts as low as 0.01% are sufficient and in others amounts as high as 10% may be found desirable.

The lubricating oil base will normally be a mineral lubricating oil derived from petroleum and of the type used in the lubrication of internal combustion engines. However, the new reaction products may advantageously be incorporated in lubricating oils ranging all the way from gasoline and kerosene to petroleum and petroleum wax. They may also be incorporated in synthetic lubricants or lubricants derived from animal or vegetable sources, or other mineral sources than petroleum.

The concentrates prepared in accordance with this invention are mixtures of the reaction products of this invention with oils or oily materials compatible with the lubricating oil in which the reaction products are finally to be incorporated. In the concentrates, the amount of the reaction product may reach 50% or even higher, although it is generally preferred, for reasons of solubility, to use not more than 25% of the reaction product in such a concentrate. Other addition agents, such as mentioned above, may be incorporated in the concentrates along with the reaction products of this invention.

What is claimed is:

1. A mineral oil containing a minor proportion, sufficient to improve the detergent properties of the oil, of a metal salt selected from the group consisting of a barium salt and a magnesium salt of a product prepared by converting wax-like aliphatic hydrocarbon mixtures originating from petroleum oil and containing from 15 to 36 carbon atoms to the molecule into a mixture of corresponding Grignard Reagents, treating the mixture of Grignard Reagents with carbon dioxide, and hydrolyzing the resulting salts with mineral acids to convert them into carboxylic acids.

2. A mineral oil containing from about 0.01% to about 10% of a barium salt of a product prepared by converting wax-like aliphatic hydrocarbon mixtures originating from petroleum oil and containing from 15 to 36 carbon atoms to the molecule into a mixture of corresponding Grignard Reagents, treating the mixture of Grignard Reagents with carbon dioxide, and hydrolyzing the resulting salts with mineral acids to convert them into carboxylic acids.

3. A mineral oil containing from about 0.01% to about 10% of a magnesium salt of a product prepared by converting wax-like aliphatic hydrocarbon mixtures originating from petroleum oil and containing from 15 to 36 carbon atoms to the molecule into a mixture of corresponding Grignard Reagents, treating the mixture of Grignard Reagents with carbon dioxide, and hydrolyzing the resulting salts with mineral acids to convert them into carboxylic acids.

FREDERICK P. RICHTER.

REFERENCES CITED

The following references are of record in the file of this patent:

UNITED STATES PATENTS

| Number | Name | Date |
| --- | --- | --- |
| 1,319,129 | Wells et al. | Oct. 21, 1919 |
| 2,137,494 | Jolly et al. | Nov. 22, 1938 |
| 2,211,941 | Sullivan | Aug. 20, 1940 |
| 2,223,473 | Wiezevich | Dec. 3, 1940 |
| 2,293,649 | Howk | Aug. 18, 1942 |
| 2,303,256 | Camelford | Nov. 24, 1942 |
| 2,320,392 | White | June 1, 1943 |
| 2,361,547 | Jenkins | Oct. 31, 1944 |
| 2,464,751 | Richter | Mar. 15, 1949 |

OTHER REFERENCES

Fieser & Fieser: Organic Chemistry; pub. 1944, by D. C. Heath & Co. of Boston, pages 170 and 171.

Certificate of Correction

Patent No. 2,560,986                                  July 17, 1951

FREDERICK P. RICHTER

It is hereby certified that error appears in the printed specification of the above numbered patent requiring correction as follows:

Column 3, line 41, after "with" strike out "the"; column 5, line 9, for "petroleum", first occurrence, read *petrolatum*;

and that the said Letters Patent should be read as corrected above, so that the same may conform to the record of the case in the Patent Office.

Signed and sealed this 13th day of November, A. D. 1951.

[SEAL]

THOMAS F. MURPHY,
*Assistant Commissioner of Patents.*